April 25, 1967   G. GÜSTRAU   3,315,944
CONTINUOUS MIXING DEVICE FOR THE MANUFACTURE
OF PLASTIC MIXTURES
Filed Oct. 23, 1965

INVENTOR.
GÜNTER GÜSTRAU
BY
Barnes, Kisselle, Raisch & Choate
ATTORNEYS

United States Patent Office 3,315,944
Patented Apr. 25, 1967

3,315,944
CONTINUOUS MIXING DEVICE FOR THE MANUFACTURE OF PLASTIC MIXTURES
Günter Güstrau, Hamburg, Germany, assignor to Cellasto Incorporated, Ann Arbor, Mich., a corporation of Michigan
Filed Oct. 23, 1965, Ser. No. 502,876
Claims priority, application Germany, Apr. 3, 1965, L 50,379
6 Claims. (Cl. 259—9)

This invention relates to a continuous mixing device for the manufacture of plastic mixtures. As a rule, such devices consist of a housing, which forms the mixing chamber, with a driven stirring mechanism disposed within this housing.

In the known mixing devices of this kind, the inlet channels are so disposed that the various plastic components are fed in separately, but radially against the centrifugal force of the stirring mechanism. This has the disadvantage that, particularly when there are large differences between the amounts being supplied, the smaller amount is forced by the larger amount to the periphery of the mixing chamber, because of the centrifugal effect of the stirring mechanism, and is not at all engaged by the mixing blades of the stirrer.

In order to counteract this harmful effect, the smaller component of the mix must be injected under very high pressure into the mixing chamber, for which a high mechanical expenditure of complicated metering pumps with corresponding maintenance is required. But with very small amounts of a component even these measures are inadequate to assure a constant rate of supply. Even short interruptions in operations thus usually lead to a premature reaction of the components of the mix and the resultant product is forced by the centrifugal force acting in the mixing chamber against the inlet openings for the component which participates in the reaction only in small amount, and seals these openings. The pressure involved for small rates of supply is generally not sufficient to prevent clogging. Thus, with the known devices, it is impossible to produce mixtures which provide high quality, particularly structurally uniform end products.

The invention is based on the problem of creating a mixing device with low mechanical expenditure, by means of which an intensive mixing of the reaction components is assured and in which particularly the continuous operation of the mixing process is assured.

Accordingly, the invention consists essentially in that the separate inlet channels for the individual components of the mix are disposed outside the mixing chamber, for example laterally or above the stirrer in the remaining housing and substantially concentric to the longitudinal central axis of the stirrer.

In a particular application of this thought, a central inlet channel is so disposed in the mixing housing that it lies on the central longitudinal axis of the stirring mechanism, while another inlet channel surrounds the first annularly, the annular channel being connected to a supply pipe which, expediently, runs radially or tangentially to the annular channel.

In this way, it becomes possible to introduce the components of the mixture axially concentrically into the stirring mechanism, which, according to a further feature of the invention, is fashioned so as to taper conically in the direction of the inlet channels. By the centrifugal effect, both components are carried with intensive mixing to the larger cross-section and then through the cylindrical part of the stirrer to the outlet. As the result of this transporting action, a material stoppage can never occur at the inlet openings of the channels within the mixing housing, and thus also no undesired packing of the material. The harmful clogging of the inlet openings, particularly during brief interruptions of operations, is thereby avoided.

Since then the centrifugal effect no longer prevents the influx of the components, very small amounts of a component I can now reliably be metered, supplied an intensively mixed, even with a very high input ratio of component II (for example 1 part of component I: at the same time 50 parts of component II).

A further advantage consists in that no high injection pressures are now required in order to introduce the components into the mixing chamber. Practically, one can operate with the static fluid pressures of the two components.

As a further refinement of the invention, the mixing housing is conically tapered in the direction of the inlet channels. The roof-like section of the housing is provided with a cylindrical extension in which the inlet channels are arranged.

In order to create an annular input gap between the inner wall of the mixing housing and the stirring mechanism, the upper section of the stirrer is also tapered in the direction of the inlet channels.

According to another feature of the invention, the outlet channel is disposed in the region of the cylindrical section of the stirrer, in the mixing housing. Expediently this channel opens into the mixing housing tangentially to the cylindrical part of the stirring mechanism. Because of this, the discharge of the finished plastic mix, for the purpose of placing into molds or the like, is favorably affected.

Another feature of the invention consists in that peg-like cams are provided on the surface of the stirrer and that these cams are so displaced with reference to one another on the surface of the stirring mechanism that they pass over practically the entire internal wall of the mixing housing. In this way mixing of the participants in the reaction is additionally furthered and, particularly, adhesion of the mixture to the internal walls of the mixing housing is to a large extent prevented.

Other objects and features of the invention will be apparent in the following description and claims.

Drawings accompanying the disclosure and the various views thereof may be briefly described as follows.

Figure 1:
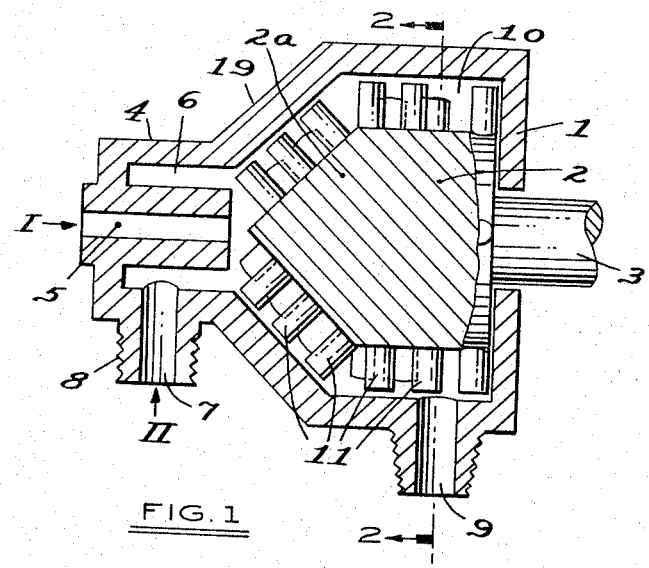
FIGURE 1 shows a longitudinal section of a mixing device disposed in a horizontal plane.
Figure 2:
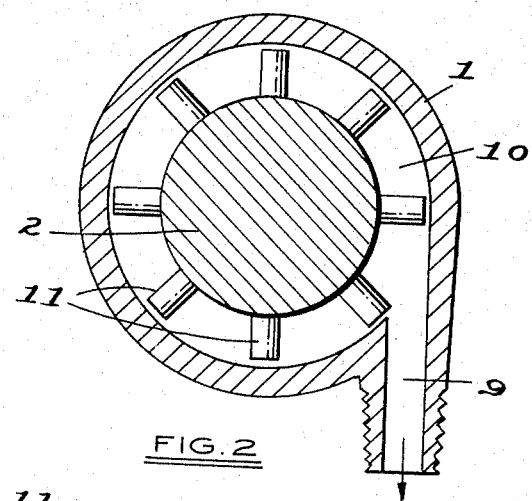
FIGURE 2 shows a section along line 2—2 of FIGURE 1.
Figure 3:
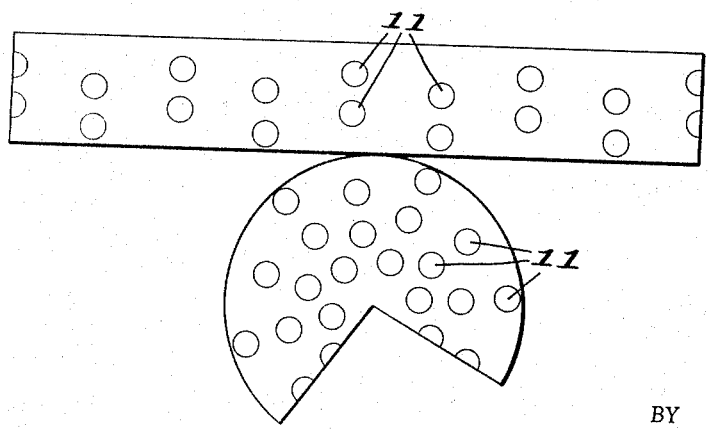
FIGURE 3 shows a plan view of the conical surface of the stirrer, with the developed cylindrical surface of the stirrer.

In the drawings, the mixing housing is designated by 1, in which a stirring mechanism, consisting of the actual stirrer 2 and the drive shaft connected therewith is 3, is mounted. The housing 1 bears a cap-like cylindrical extension 4, in which is fashioned a central inlet channel 5, running axially with the longitudinal central axis of the stirrer, for the supply of smaller amounts of a mix component I. The channel 5 is surrounded by a second inlet channel 6 for the supply of the larger amount of a mix component II, is for this purpose fashioned annularly, and is connected outside with a supply line 7, which is fashioned in a radial offset 8 of the cylindrical part 4 of the housing. The supply line 7 can open into the annular channel 6, either radially or tangentially. An outlet channel 9 is disposed in the base of the housing 1, near the bottom and directed tangentially to the mixing chamber 10. The housing 1 which forms the mixing chamber has a conical section 19, which tapers conically in the direction of the inlet channels. The stirrer 2 also is fitted to this taper and extends toward the inlet channels in a conical section 2a, the tip of which lies on the center line of the central inlet channel.

On the cylindrical and the conical surface of the stirrer 2, peg-like cams 11 are disposed, displaced from one another such that, allowing a narrow gap between the internal wall of the housing 1 and the ends of the cams, the entire internal wall surface of the mixing housing can substantially be swept over.

The mixing device according to the invention can be used arranged horizontally or vertically with all conventional mixing machines without major readjustment.

What is claimed as new is as follows:

1. A continuous mixing device for mutually reacting compounds utilized in the manufacture of plastic mixtures which comprises a housing having an entrance end and a discharge end and a mixing chamber therebetween, said entrance end having formed therein an unobstructed passage for the ingress of one material, said passage leading to said mixing chamber and being surrounded by an annular wall which forms an annular chamber with said housing, and a second passage in said housing for the ingress of a second material entering the annular chamber, said annular chamber connecting with the mixing chamber, and a mixing device in said mixing chamber comprising a rotating body member having portions extending to a point adjacent the walls of said housing to sweep the area in said mixing chamber and move materials from said entrance passages to an outlet passage at said discharge end.

2. A continuous mixing device for the manufacture of plastic mixtures which comprises, a housing having an enlarged egress passage at one portion thereof and a plurality of entrance passages at another remote and ensmalled portion thereof, a first of said entrance passages having a widened portion and another of said entrance passages terminating at said widened portion to introduce a material entering from said other entrance passage into the midst of another material entering from said first passage, and a mixing means in said housing between said entrance and egress passages to move and mix material entering said housing, and means for mounting said mixing means for rotation in the enlarged end of said housing independent of the ensmalled portion and being shaped to enlarge from the entrance passages to the egress passages and having portions projecting to sweep near the interior walls of the housing in rotation.

3. A continuous mixing device for the manufacture of plastic mixtures which comprises:

(a) a housing having means forming an annular chamber at one portion thereof open at one end to an enlarged mixing chamber, said mixing chamber having an outlet passage spaced from said chamber, (b) means forming an entrance passage connecting to said annular chamber, (c) means forming a second entrance passage opening to said mixing chamber within the area defined by said annular chamber, and (d) a mixing means in said mixing chamber to move material by rotation from said entrance passages to said outlet passage, (e) the said housing comprising a hollow body having a small and a large cylindrical portion connected by a tapering portion, said small portion having an axial projection forming said annular chamber therein, and a first entrance passage through said body into said annular chamber and a second entrance passage through said axial projection.

4. A device as defined in claim 3 in which said mixing means comprises a rotor mounted for rotation in said mixing chamber shaped with outer surfaces spaced from said cylindrical portion and said tapering portion, and projections on said rotor spaced from each other and positioned to sweep substantially the entire wall surface of said mixing chamber.

5. A device as defined in claim 4 in which the rotor is mounted on a shaft projection through said housing at a portion opposed to the location of said entrance passages.

6. A device as defined in claim 3 in which said outlet passage of said housing is tangential to said larger cylindrical portion and adjacent a flat closing wall opposed to the small portion, and said mixing means comprises a rotor with projecting means extending toward the tapered and large cylindrical portion of said housing and mounted on a shaft entering through said flat closing wall.

References Cited by the Examiner

UNITED STATES PATENTS

| | | | |
|---|---|---|---|
| 2,915,301 | 12/1959 | Selden | 259—4 |
| 2,957,203 | 10/1960 | Marshall | 259—7 |
| 2,990,380 | 6/1961 | Averbach | 259—8 |
| 2,992,084 | 7/1961 | Schropp | 259—4 |
| 3,086,243 | 4/1963 | Bergmeister et al. | 259—4 |

WALTER A. SCHEEL, *Primary Examiner.*

R. JENKINS, *Examiner.*